United States Patent

[11] 3,607,126

[72] Inventor Robert W. Pfeiffer
 Bronxville, N.Y.
[21] Appl. No. 5,169
[22] Filed Jan. 23, 1970
[45] Patented Sept. 21, 1971
[73] Assignee Pullman Incorporated
 Chicago, Ill.
 Continuation-in-part of application Ser. No. 719,052, Apr. 5, 1968, now Patent No. 3,492,221.

[54] FLOW-DIRECTING DEVICE
 7 Claims, 3 Drawing Figs.
[52] U.S. Cl. .................................................. 23/288 E,
 23/288 S, 138/26, 208/153, 208/155, 208/164,
 285/47, 285/55, 285/156
[51] Int. Cl. ............................................... B01j 9/16,
 F16l 55/00, F16l 59/16
[50] Field of Search ........................................ 23/288.3,
 288.3 S; 208/164, 153, 155; 138/26, 30; 302/29,
 51, 45; 285/156, 179, 47, 48, 55

[56] References Cited
 UNITED STATES PATENTS
 2,350,759 6/1944 Hilmer et al. .................. 23/288 S X
 3,131,032 4/1964 McKenna ....................... 23/288 S
 3,475,326 10/1969 Luckenbach .................. 23/288 S X
 FOREIGN PATENTS
 501,591 7/1930 Germany Primary Examiner—Joseph Scovronek
Attorneys—John C. Quinlan and Margareta Le Maire ABSTRACT: A hollow, truncated cone-shaped device, having an inlet in the smaller diameter area of the cone and one or more outlets in the conical surface.

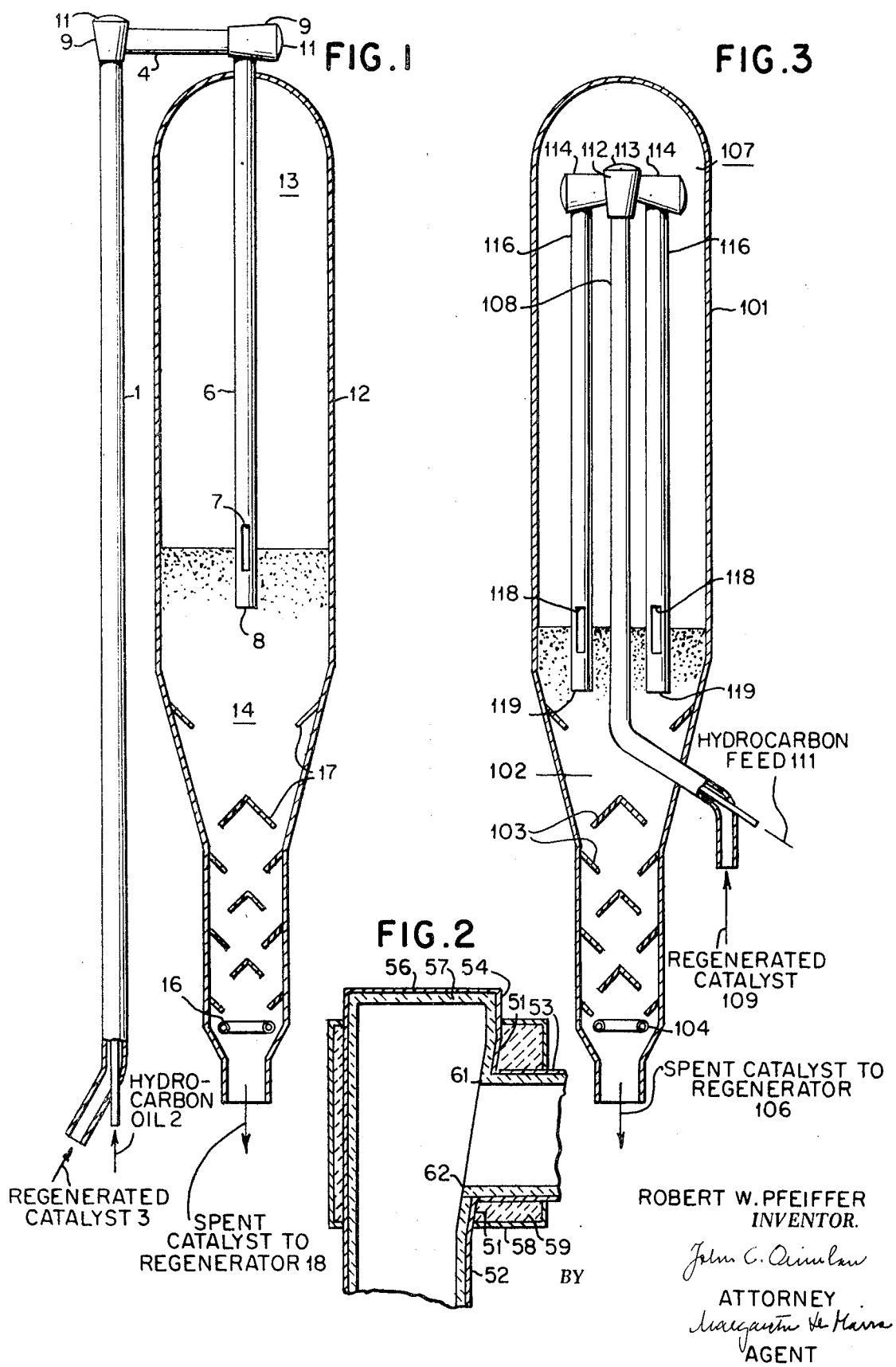

FLOW-DIRECTING DEVICE

This application is a continuation-in-part of pending application Ser. No. 719,052, filed Apr. 5, 1968, now U.S. Pat. No. 3,492,221, granted Jan. 27, 1970.

The present invention relates to a device for changing the direction of flow of highly erosive material, such as a suspension of solids and gases and vapors, flowing through a confined, elongated conduit at high velocities. In a specific aspect of the invention, the device is incorporated in an apparatus for the conversion of hydrocarbons at relatively short contact times.

Although not so limited, the invention will be hereinafter described in connection with the aforementioned hydrocarbon conversion apparatus.

In recent years, commercial catalytic cracking catalysts have been developed which are highly active and also exhibit superior selectivity towards the formation of desirable products such as gasoline at the expense of coke and light ends production. Examples of such catalysts are those of the types commonly called "high alumina" and "molecular sieve" catalysts. It has been found that maximum benefit is derived from these catalysts by reducing the time the catalyst is in contact with the hydrocarbons undergoing cracking in the reaction zone. For this reason, it is preferred to carry out the catalytic cracking operations employing so-called dilute or disperse phase cracking techniques, i.e., the catalyst is contacted with a hydrocarbon feed stream moving through the reaction zone at sufficiently high superficial velocities that the catalyst is carried along in said stream as a dilute suspension and with a minimum of back mixing.

In general, catalytic cracking of relatively high boiling hydrocarbons to form substantial quantities of materials boiling in the gasoline range carried out in the following process sequence: hot regenerated catalyst is contacted with preheated hydrocarbon feed in a reaction zone under conditions suitable for cracking, the cracked hydrocarbon vapors are disengaged from the spent catalyst, which is subsequently fed to a stripping zone where it is contacted with a gasiform stripping agent, whereby volatile hydrocarbon material is stripped from the catalyst. The stripped catalyst is then transferred to a regeneration zone where it is regenerated by burning carbonaceous deposits from the catalyst using an oxygen-containing gas such as air, after which the regenerated catalyst is transferred to the reaction zone for reuse. The hydrocarbon material from the reaction zone and the stripping zone is transferred to a recovery system including suitable fractionation equipment for recovery of gaseous products, gasoline and one or more heavier fractions boiling above the gasoline range. The latter fractions may be withdrawn as products of the process or may at least in part be recycled to the reaction zone for further cracking.

The operating conditions employed to achieve catalytic cracking of hydrocarbons according to the aforementioned disperse phase cracking techniques include regenerator temperatures between about 1,100° F. and about 1,500° F. and regenerator dilute phase pressures from about atmospheric pressure to about 35 p.s.i.g. The outlet of the disperse phase reaction zone can be operated in a temperature range above 850° F. and preferably between about 925° F. and about 1,000° F. or even higher. Suitable reaction zone pressures are between about 5 p.s.i.g. and 50 p.s.i.g. The relative weights of catalyst and total hydrocarbons flowing through the elongated confined reaction zone, i.e., the so-called catalyst to oil ratio is preferably maintained at values ranging between about 2 and about 20. The length and volume of the elongated reaction zone should be sufficient to provide contact times therein from about 0.5 second to about 4 seconds or even higher, while the cross-sectional area of said zone is designed to result in superficial velocities of the suspension ranging between about 15 ft./sec. and about 25 ft./sec. in the vicinity of the hydrocarbon feed inlet and between about 20 ft./sec. and 60 ft./sec. at the reactor outlet. When combinations of these conditions are employed, it is possible to selectively crack the hydrocarbons at very high conversions, the conversion being the portion of the hydrocarbon feed boiling above the gasoline range which is converted to coke, gaseous products and liquid products boiling within the gasoline range. In present commercial installation the conversions are generally about 70 volume percent. However, there are considerable additional benefits to be had, if the hydrocarbons were to be cracked at even higher conversions, e.g., in the range between about 75 and about 85 percent, in a mechanically safe and relatively inexpensive reaction vessel.

The operating conditions employed in the stripping of spent catalyst in a stripping zone includes temperatures above about 825° F., and preferably between about 900° F. and about 975° F., and pressures ranging between about 10 p.s.i.g. and about 55 p.s.i.g. The amount of stripping medium relative to the catalyst circulation is advantageously maintained between about 1 and about 10 pounds per 1,000 pounds of circulated catalyst. Superficial velocities of the stripping medium are from about 0.5 ft./sec. to about 2.0 ft./sec.

In order to achieve the aforementioned desired high conversions in commercial installations processing large quantities of feed per day, the required length and volume of the confined reaction zone through which the dilute suspension of hydrocarbon is passed would be quite considerable, resulting in extremely tall structures, which from both a mechanical and a safety standpoint would be difficult to design and maintain and inherently would also be expensive.

It is therefore an object of the present invention to provide a device for changing the direction of flow of solids suspensions, wherein erosion problems will be minimized.

Another object of the invention is to provide means for reducing the height of a hydrocarbon conversion transfer-reaction conduit.

Other objects of the invention will readily be apparent to those skilled in the art from the following detailed description, the drawings and the appended claims.

In accordance with the present invention there is provided a flow-directing device which comprises a structure having at least one side wall and two opposite openings of different cross-sectional area, the smaller area opening being the inlet to said device, at least one outlet means in a sidewall of said structure and cap means for closing off said larger opposite opening. The geometry of the structure could be of any shape wherein the inlet is of a smaller cross-sectional area than its opposite capped opening, e.g., such shapes could be swages, bells, truncated hemispheres, etc. Preferably, however, said structure has a conical side wall, i.e., the structure is a hollow, truncated cone having an inlet in the smaller area of said cone, at least one outlet in the conical surface, and cap means closing the larger area of the cone.

It is to be understood that a cone is defined in the broadest, general terms and that it designates any path of or surface traced by a straight line (= the generatrix) that always passes through a fixed point (= the vertex). This path, to be definite, is directed by some curve (= the directrix), along which the line always glides. The directrix can have any shape, e.g., a circle, an ellipse or even an irregular shape. The definition of an oblique cone is a cone where the straight line connecting the vertex and the center of the base, which is traced by the directrix, is not at right angles to said base. A symmetrical cone is one wherein any plane passing through the vertex and the center of the base of the cone divides the cone in two symmetrical sections. A right-circular cone is a symmetrical cone having a circular base.

The inlet of the cone is connected to one portion of an elongated transfer conduit and the outlet usually to another such portion. In a further preferred embodiment the device is comprised of a truncated, hollow oblique cone, extending from one such portion of the transfer conduit, the far end of the cone being its base of larger area and having a cap covering and closing said larger base. It has been found that erosion can be reduced substantially if the change in direction of flow is about right-angled, i.e., said change is between about 75° and about 105°. Thus, the projected longitudinal axes of the inlet and an outlet of the cone, whether right-circular, symmetrical or oblique, should intersect each other at angles included in the aforementioned range.

It is also preferred, that there is provided between the base of the device and the cap an extension, e.g., a hollow cylindrical extension of the same area as that of the base. As in the case with the definitions of cones, a cylinder is defined in the broadest general terms. It designates the surface traced by the generatrix moving without turning, i.e., always parallel to itself or to some fixed line or direction. The generatrix is directed by the directrix, which can have any shape, e.g., a circle, an ellipse or even an irregular shape. The suspension enters through the smaller area of the structure and exits through the side outlet provided in the surface, the side outlet preferably having a cross-sectional area such that there is no substantial change in the velocity of the suspension as it flows through the device. The design has the advantage over e.g., a so-called side-out tee in that sharp edges at changes of direction of flow, which are particularly subject to erosion, have been removed from the direct line of impingement of a major portion of the solids suspension. The sudden change in direction of the high-velocity suspension causes solids to collect as a relatively dense suspension within the devices, especially in the respective closed portions thereof (e.g., in the larger area of the cone or in the extension thereof), and said collected solids serve as a protective cushion on which the suspension impinges. The closed end portions of the aforementioned devices can be periodically opened for inspection and maintenance purposes without necessitating dismantling of any other part of the transfer conduit.

It is to be understood that the aforementioned devices can be used whenever it is desired to achieve at least one sharp change in the direction of flow of an erosive high-velocity suspension, and that the transfer conduit may not necessarily function as a reaction vessel. It is also to be understood that the device can have more than one outlet in its surface to provide for branching of the material flowing into the device. Such a design is particularly useful when it is desired to employ multiple transfer zones but the available space prohibits the full use thereof. Considerable savings in space can then be obtained by employing, for instance, a common riser portion and a cone with two or more outlets each connected to a crossover portion. Also, the outlet of one cone could be connected directly to the inlet of another such cone, thereby providing for an even greater immediate change in direction of flow, where space is limited, i.e., with two such cone devices a substantially complete reversal in the direction of flow can be achieved without experiencing significant erosion problems.

In addition, the primary structures forming these devices can advantageously be enclosed within secondary protective structures of suitable designs, e.g., offset cylinders, where the annular space between a device and its corresponding secondary protective structure may be filled with an erosion resistant refractory material. Thus in case of an actual erosion failure in the primary structure forming the device, the secondary protective structure will continue to maintain the suspension within the transfer conduit. In such event plant operations need not be disrupted due to an erosion failure of the primary device, but can be continued for relatively long periods of time before plant shutdown for maintenance becomes necessary. It is to be understood that any other localized area of the transfer conduit found to be subject to severe erosion could also be enclosed within secondary protective structures similar to the ones previously described.

The device of the invention is particularly useful, when it is incorporated in the design of a transfer-reaction conduit for the conversion of hydrocarbons at short contact times, e.g. the catalytic cracking of hydrocarbons in dilute phase. Such an apparatus would be comprised of a substantially vertical riser portion and one flow-directing device of the invention. Preferably, a second such flow-directing device and a substantially vertical downcomer portion would also be included.

Means are provided for introducing freshly regenerated catalyst and hydrocarbon feed to a bottom section of the vertical riser. The outlet section of the downcomer is usually provided with means for separating the spent catalyst from the cracked hydrocarbon vapors. To accomplish this separation, such means can be one or more cyclones, the inlet of the primary cyclone being directly connected to the outlet of the downcomer. Other alternatives include a disengaging zone of a substantially larger cross-sectional area than that of the downcomer and enveloping the outlet of said downcomer, such that the velocity of the suspension upon discharge from the downcomer is drastically reduced, resulting in separation of the suspension into spent catalyst and cracked hydrocarbon vapors. The solids outlet of any of these separating means is in communication with a conventional stripping zone, which can be maintained in a separate vessel or, where applicable, in the bottom portion of the vessel containing the aforementioned disengaging zone. The vapor outlet from any of these separating means is in communication with a conventional product recovery zone, and stripped catalyst is passed to a vessel housing a conventional regeneration zone. The elongated confined transfer-reaction zone preferably includes an erosion-resistant refractory lining, which serves as the primary protection for the metal structure forming said zone.

The outlet of the downcomer can be buried beneath the surface of a fluidized dense bed of catalyst maintained in a vessel. Further cracking of the hydrocarbon vapors exiting the transfer conduit takes place in this bed. Additional hydrocarbons, e.g., hydrocarbons not suitable for short contact time cracking can also be fed to said dense bed.

The transfer conduit can be contained partially or completely within a vessel serving as a zone for further cracking and/or as a disengaging zone. This is particularly so when the reaction side of an existing commercial installation is to be revamped from dense fluidized bed operations to dilute phase operations and the existing reaction vessel is therefore available. The size of such an existing vessel in conjunction with the desired feed throughput and the desired level of conversion, which affect the physical dimensions of the transfer-reactor conduit, are the major factors to consider when designing this system. For instance, when both throughput and conversion are to be increased substantially, it might be required, or preferred, to design a conduit-vessel system, in which a substantial portion of the conduit would be located outside the vessel. In extreme cases, only the very outlet section of the downcomer portion would be enclosed by the vessel.

When employing the apparatus of the invention, a considerable reduction in actual height of the reaction zone is realized. Such a reduction in height can amount to as much as one-half or even more. There are several advantages of a reaction zone of reduced height, e.g., structures needed for support of extremely tall vertical vessels, having large length to diameter ratios, can be minimized or obviated. Also, the overall plant layout can be considerably simplified, since one has almost complete freedom in selecting the elevation from ground level of the outlet of the downcomer portion of the transfer conduit. This is particularly so, when only the reactor side of an existing commercial installation is to be revamped, other appurtenant facilities thereof being adequate, such as the stripper, regenerator, etc.

In order to provide a better understanding of the invention, reference will be had to the accompanying schematic drawings, which form a part of this specification.

In the drawings:

FIG. 1 shows an elevated view of a specific example of an apparatus for the conversion of hydrocarbons, said apparatus including a transfer conduit having a vertical riser, a crossover and a downcomer connected by the flow-directing devices of the invention.

FIG. 2 is a specific example of such a device for changing the direction of flow of an erosive disperse phase suspension.

FIG. 3 is an elevated view of another specific example of an apparatus for the conversion of hydrocarbons, wherein the transfer conduit system is comprised of a common riser portion, a conical device with two outlets connected to the inlets of two cones and the outlets of the latter being connected to two respective downcomers.

Referring now to FIG. 1, which depicts a transfer line cracking zone in communication with a separation zone and a stripping zone, a vertical riser portion 1 is provided having a hydrocarbon feed inlet 2 and a regenerated catalyst inlet 3. A dilute suspension of such vaporized hydrocarbon feed and regenerated catalyst flows through the vertical riser portion into the horizontal crossover portion 4 and subsequently into the vertical downcomer portion 6, which is, at the outlet thereof, in direct communication with means for separating the cracked vapors from the spent catalyst, in this embodiment the means being the vapor space 13 of vessel 12. Slots 7 are provided for the discharge of the suspension into vessel 12 and cap 8 closes off the extreme end of the downcomer. The respective riser-crossover and crossover-downcomer portions are connected by means of truncated oblique cones 9, which are closed at the far end of their runs by means of caps 11. All internal surfaces of these devices for changing the direction of flow and all connecting conduits thereto are lined with an erosion-resistant refractory material. The downcomer portion 6 enters vessel 12 through the top, said vessel serving as a separation zone and a stripping zone. The cracked vapors-spent catalyst suspension exiting slots 7 are disengaged in the vapor space 13 above the bed 14, which is contained in the lower portion of vessel 12. Stripping and fluidizing steam is provided to said bed and distributed by distributor 16. The lower portion of vessel 12 is further provided with baffles 17 to improve the stripping efficiency. Spent catalyst is withdrawn through conduit 18 and is transported to a regeneration vessel (not shown), where it is contacted with an oxygen-containing gas, such as air, to remove carbonaceous deposits from the catalyst. Cracked vapors and the additional hydrocarbon-containing vapors resulting from the stripping of the spent catalyst are passed to cyclones (not shown) for recovery of catalyst entrained in said vapors and then passed to a conventional product recovery zone (not shown).

FIG. 2 depicts in detail a cone device, similar to the ones shown on FIG. 1. This device is described hereinafter with respect to its connection to a vertical riser portion 52 and a crossover portion 53; however, it can equally well be employed to connect a horizontal crossover with a subsequent vertical downcomer. The device is comprised of a truncated oblique cone 51 which is connected at its lesser diameter section to riser conduit 52 and at its oblique surface to the crossover section. A cylindrical extension 54 is provided at the larger diameter area of the cone which is capped by means of plate 56 or alternatively by other suitable closures such as a dished or ellipsoidal head. All internal metal surfaces of the cone device, as well as of all connective conduits are lined with an erosion-resistant refractory material 57, serving as primary protection therefore. A secondary protection is obtained by the enclosure of the device within a cylindrical structure 58, which is filled with additional erosion-resistant refractory material 59. The high-velocity upflowing solids suspension from riser 52 causes solids to be collected and held in relatively dense suspension within the portion of the device extending above crossover conduit 53, and said solids act as a further protection against erosion in this area as the high-velocity suspension impinges thereon. The advantage of the device of FIG. 2 lies primarily in the removal of sharp projections 61 and 62 from the direct line of travel of the high-velocity eroding suspension, thereby considerably reducing erosion at such projections.

FIG. 3 shows another embodiment of the invention, wherein the major portion of the transfer conduit is located within a vessel 101, said vessel being identical to the one of FIG. 1. Thus, there is a stripping zone 102, equipped with baffles 103, steam distributor 104 and spent catalyst drawoff 106, said zone being located in the lower portion of the vessel and a disengaging zone 107 in the upper portion thereof. Cyclones and vapor outlet are not shown. A central riser portion 108, which is substantially vertical except for the first section thereof, is provided with regenerated-catalyst inlet 109 and hydrocarbon inlet 111. The outlet of the riser is connected to the smaller diameter area of a truncated, symmetrical, hollow cone 112, which is capped at its far end by cap 113. In the conical surface there are two outlets, spaced 180° apart. Each outlet is connected to the inlet of a truncated, hollow, oblique cone 114. In the conical surface of each of the oblique cones there is an outlet, which is connected to the top of a vertical downcomer 116, provided with discharge slots 118 and caps 119. In this embodiment of the invention the truncated, oblique cones serve as both the means for lateral transport and the means for changing the direction of flow.

It will be obvious to those skilled in the art, that many modifications may be made within the scope of the present invention without departing from the spirit thereof, and the invention includes all such modifications.

What is claimed is:

1. A flow-directing device, which comprises: a hollow truncated cone having a conical sidewall and two opposite openings of different cross-sectional areas, the smaller opening being the inlet to said device:

at least one outlet means in the conical sidewall, the projected longitudinal axes of the inlet and outlet intersecting each other at angles in the range from about 75° to about 105°;

cap means for closing off the larger opening opposite to the inlet of said device; and a lining of an erosion-resistant refractory material affixed to the internal surfaces of the device.

2. A device according to claim 1, in which an extension to the structure is provided between said larger cross-sectional opening area thereof and the cap means.

3. A device according to claim 1, in which the outlet of a first such device is directly connected to the inlet of a second such device.

4. A device according to claim 1, in which said cone is spatially enclosed within a protective structure.

5. A device according to claim 1, in which the conical sidewall is a sidewall of a truncated, symmetrical cone.

6. A device according to claim 1, in which the conical sidewall is that of a truncated, oblique cone.

7. A device according to claim 4, in which the space between said cone and its respective protective structure is filled with an erosion-resistant refractory material.